Dec. 1, 1925.
J. C. ROSS
1,563,589
FAUCET
Filed March 5, 1925
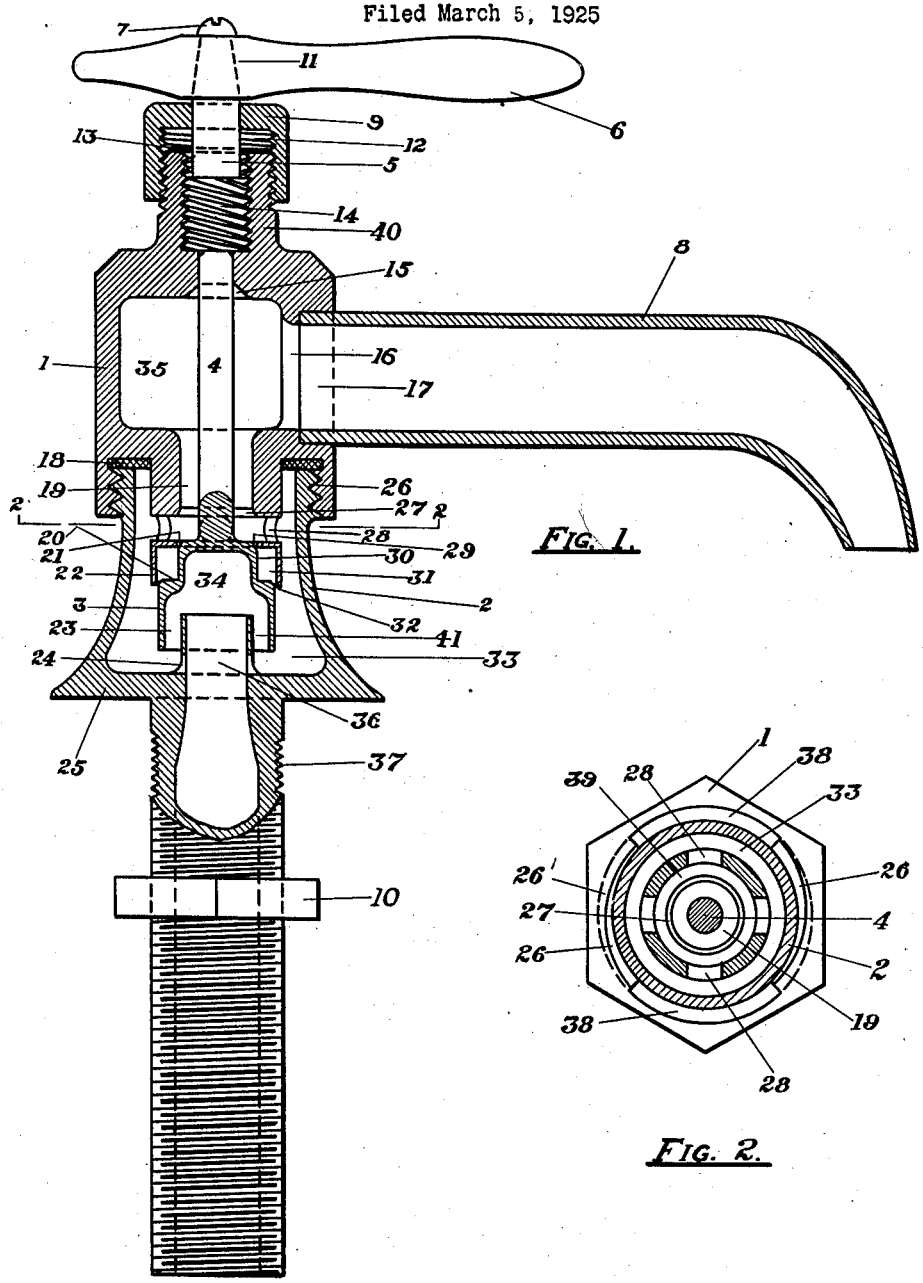
INVENTOR
James C. Ross
BY
Pierre Barnes
ATTORNEY Patented Dec. 1, 1925.

1,563,589

UNITED STATES PATENT OFFICE.

JAMES C. ROSS, OF SEATTLE, WASHINGTON.

FAUCET.

Application filed March 5, 1925. Serial No. 13,215.

*To all whom it may concern:*

Be it known that I, JAMES C. Ross, a citizen of the United States, residing at Seattle, in the county of King and State of Washington, have invented certain new and useful Improvements in Faucets, of which the following is a specification.

This invention relates to faucets of the automatically closing type.

The object of the present invention is the provision of an improved faucet of this nature which will be of compact construction, efficient in operation, and with the operating parts readily accessible for renewal and repair.

A further object is to provide a faucet with improved automatic valve regulating means which will cause the valve to close slowly and noiselessly.

More specific objects will be obvious in the following description.

The invention consists of the novel construction, adaptation and combination of parts hereinafter described and claimed.

In the accompanying drawing—

Figure 1 is a vertical section of a valve in its embodiment now preferred by me; and Fig. 2 is a horizontal section on line 2—2 of Fig. 1, looking upwardly.

In said drawing, the reference numerals 1 and 2 designate the upper and lower members, respectively, of the faucet body, the same being detachably connected with each other by inter-engaging screw threads.

To facilitate uniting and separating of said members, the threaded portions of the body members are slotted longitudinally as at 38 (Fig. 2) to afford incomplete screw threads, as 26 and 26¹, on the respective members. Such incomplete threads, circumferentially of the respective members, being of lengths slightly less than the widths of said slots, thus permitting the members being joined by first inserting the threads of one member into the slots of the other member and then turning the member 1 into engaged relation with the member 2. 18 represents a gasket to prevent leakage at the joint between the body members.

Integral with the member 2 is a nipple 37 which is externally screw threaded for engagement with a service pipe (not shown) and also for the purpose of receiving a nut 10 which cooperates with the base 25 of the body for securing the faucet in place.

Within the chamber 33 of the body member 2, is an extension or nozzle 36 of the nipple 37, said nozzle element projecting upwardly from the base 25. Provided above said base in the peripheral wall of the element 36 is one or more apertures 24 for the escape of water from the chamber 33 when it is desired to drain the latter. The body member 1 is provided at one side of its chamber 35 with an outlet 16 which communicates with the inlet 17 of a spout 8 which is rigid with said member.

The member 1 is formed with a cylindrical neck 40, the same being externally screw threaded for engagement with the internal threads of a bonnet 9 which serves as a gland for retaining packing (not shown) in the space 12 above a washer 13 which is seated upon the top of the neck 40. This neck is provided with internal screw threads that are engageable with the screw threads of an operating stem 14 which extends through the bonnet 9 and thereabove is tapered as at 11 to fit into a corresponding hole in a handle 6. 7 indicates a screw for securing the handle to said operating stem.

Integral with the body member 1 and projecting downwardly into the chamber 33 is an extension 22 through which is a passage 19 affording communication between the referred to chamber and radially disposed ducts 28 communicating with the chamber 33.

Below the ducts 28, the extension 22 is bored as at 31 from its underside to provide a cavity, fitting within which, or nearly so, is a cylindrical piston 3 having an upper cylindrical portion 30 of relatively smaller diameter which extends through a circular opening 21 provided in the wall above the bore 31. The piston 3 and the portion 30 constitute the valve proper of the faucet. Such valve is provided with a stem 4 which extends through a guide hole 15 of the body member 1 into position to be engaged by the operating stem 14. To enable said valve to function, the same is formed, as shown, with a peripheral bevel 29 which is engageable directly against a bevel seat 27 provided at the lower end of the passage 19.

The illustrated construction above described, with regard to the valve seating-surface 29, is now preferred by me, but it is not intended to limit myself specifically thereto, as known valves such as that conventionally designated as a "Fuller's valve" may in lieu thereof be mounted upon the stem 4 to engage the seat 27.

The illustrated valve is hollow to afford a cavity 34 into which the water supply nozzle 36 projects, the lower portion of this cavity 34 being of a diameter greater than said nozzle to furnish an annular conduit 23 leading from the nozzle into the chamber 33. The space 31 surrounding the valve part 30 serves as a receptacle for a body of water which acts against the annular shoulder 20 of the valve and, subject to the escape of water gradually through the interstice 32 from such receptacle, regulates the closing of the valve with respect to its seat 27.

In other words, the pressure of water discharging from the nozzle 36 effects the closing of the valve, but which is restrained by the dash-pot action of the gradually lessening body of water within the space 31.

In operation, the valve is shown as held in its open position by means of the operating stem 14 and, thus arranged, water supplied under ordinary service pressure will be discharged through nozzle 36 and cavity 34 into the chamber 33, and thence the water passes through ducts 28 and passage 19 into the chamber 35 whence it is delivered through the spout 8. For closing the valve the operator regulates the handle 6 to retract the operating stem 14, whereupon the service water from nozzle 36 impels the valve 3—30 upwardly against its seat 27 thereby stopping the flow of water from the chamber 33. Such valve closing action is, however, done in opposition to the effective resistance afforded by the water within the cavity 31, resulting in the slow, steady, and noiseless closing of the valve.

What I claim is,—

1. In a faucet. the combination with the body having a water receiving chamber provided with water inlet and outlet openings respectively at the lower and upper portions of the chamber, a valve seat at said outlet opening, a cylinder rigid with the body, said cylinder being of less diameter than the chamber and in spaced relation from both of said openings to afford therebetween a communicating passage exteriorly of the cylinder, a valve for said seat, a hollow piston rigid with the valve and operating within the cylinder for regulating the closing movement of the valve, and manually actuated means for effecting an opening movement of the valve.

2. In a faucet, a body having a water receiving chamber, a cylinder rigid with the body and located in spaced relations with respect to the top and bottom of the chamber, said cylinder having a top wall provided with a centrally disposed aperture, a water outlet and a valve seat therefor located above said cylinder wall, an inlet nozzle extending upwardly into the chamber below the cylinder, a piston operable within the cylinder bore and having an extension extending through the wall aperture of the cylinder to serve as a valve for said seat, said valve being moved into closing position by the impact of water from the orifice of said nozzle subject to the restrictive action of a body of water between the piston and said cylinder wall, and manually operable means for effecting the opening movement of the valve.

3. In a faucet, a body comprising two chambered members separably connected together one above the other, the lower of said members having a water-inlet nozzle extending into its chamber, the upper member having an extension depending into the chamber of the lower member and having a cylinder bore at its lower extremity, communicative connections between the body chambers said connections including a passage extending downwardly from the upper chamber to a valve seat and thence to the upper portion of the lower chamber, a piston acting within said bore and having an extension adapted to serve as a valve with respect to said seat, a stem extending from the valve through said passage and the upper chamber of the body, said piston having in its underside a cavity for the impact of water from said nozzle to effect the elevation of the piston and the valve into closing relation with said seat, and manually actuated means engaging against the end of the valve stem for effecting the opening movement of the valve with respect to the seat.

Signed at Seattle, Washington, this 21st day of February, 1925.

JAMES C. ROSS.